United States Patent
Kaestle (10) Patent No.: US 8,125,156 B2
(45) Date of Patent: Feb. 28, 2012

(54) CIRCUIT ARRANGEMENT FOR OPERATING AT LEAST ONE HIGH-PRESSURE DISCHARGE LAMP

(75) Inventor: Herbert Kaestle, Traunstein (DE)

(73) Assignee: OSRAM AG, Munich (DE)

( * ) Notice: Subject to any disclaimer, the term of this patent is extended or adjusted under 35 U.S.C. 154(b) by 2246 days.

(21) Appl. No.: 10/888,022

(22) Filed: Jul. 12, 2004

(65) Prior Publication Data
US 2005/0285544 A1    Dec. 29, 2005

(30) Foreign Application Priority Data

Jul. 24, 2003 (DE) .................................. 10333820

(51) Int. Cl.
*H05B 37/00* (2006.01)
(52) U.S. Cl. ...................... 315/224; 315/307; 315/DIG. 2
(58) Field of Classification Search .................. 315/224, 315/307, 308, 194, 198, 199, 195, DIG. 2, 315/DIG. 5
See application file for complete search history.

(56) References Cited

U.S. PATENT DOCUMENTS 4,904,907 A * 2/1990 Allison et al. ................ 315/307
(Continued)

FOREIGN PATENT DOCUMENTS

| EP | 1434471 A1 | 6/2004 |
| JP | 11297482 A | 10/1999 |
| WO | 9722232 A1 | 6/1997 |

(Continued)

OTHER PUBLICATIONS

English language abstract for JP 11297482 A, Oct. 29, 1999.

(Continued)

*Primary Examiner* — David Hung Vu (57) ABSTRACT

A circuit arrangement for operating at least one high-pressure discharge lamp (16), has four switches ($Q_1$ to $Q_4$) in a full-bridge arrangement (14), a first and a second switch ($Q_1$, $Q_2$) forming the first half-bridge arm, and a third and a fourth switch ($Q_3$, $Q_4$) forming the second half-bridge arm, at least two terminals for coupling the high-pressure discharge lamp (16) between the midpoint of the first and the second half-bridge arms, at least two terminals for supplying the circuit arrangement (10) with a dc voltage signal and a drive circuit (20) for driving the four switches ($Q_1$ to $Q_4$). The drive circuit (20) is designed to provide drive signals, ($z_1(t)$, $z_2(t)$, $\bar{z}_1(t)$, $\bar{z}_2(t)$) for the four switches ($Q_1$ to $Q_4$), whose clock pulse ($f_t$) is swept between a first and a second frequency, and whose pulse width and/or phase is modulated with a prescribable third frequency ($f_a$).

13 Claims, 6 Drawing Sheets

U.S. PATENT DOCUMENTS

| | | | |
|---|---|---|---|
| 5,923,129 A * | 7/1999 | Henry | 315/307 |
| 6,483,259 B1 | 11/2002 | Kramer | |
| 2002/0041165 A1 | 4/2002 | Cammack | |
| 2002/0047644 A1 | 4/2002 | Ito et al. | |
| 2003/0117086 A1 | 6/2003 | Kramer | |

FOREIGN PATENT DOCUMENTS

| | | | |
|---|---|---|---|
| WO | 0079841 A1 | 12/2000 |
| WO | 0209480 A1 | 1/2002 |
| WO | 0230162 A2 | 4/2002 |
| WO | 03024161 A1 | 3/2003 |

OTHER PUBLICATIONS

European Search Report of EP Application No. 04015908 mailed Feb. 4, 2009.

* cited by examiner

CIRCUIT ARRANGEMENT FOR OPERATING AT LEAST ONE HIGH-PRESSURE DISCHARGE LAMP

FIELD OF THE INVENTION

The present invention relates to a circuit arrangement for operating at least one high-pressure discharge lamp, having four switches in a full-bridge arrangement, a first and a second switch forming the first half-bridge arm, and a third and a fourth switch forming the second half-bridge arm, at least two terminals for coupling the high-pressure discharge lamp between the midpoint of the first and the second half-bridge arms, at least two terminals for supplying the circuit arrangement with a dc voltage signal and a drive circuit for driving the four switches.

BACKGROUND OF THE INVENTION

Such circuit arrangements are known from WO 02/30162 A2, from WO 03/024161 A1 and from US 2002/0041165 A1. All these printed documents address the problems arising with high-pressure discharge lamps, specifically the occurrence of different color characteristics in vertical and horizontal operation. In vertical operation, in particular, color segregation occurs. The causes of this reside in the fact that there is an incomplete mixing of the metal additives in the discharge region. It is proposed as counter measure to excite the second longitudinal acoustic resonance. A fundamental circuit configuration for this purpose is known from the U.S. application bearing the Ser. No. 09/335,020 dated 17 Jun. 1999. However, although the approach described therein does seem suitable for generating the desired drive signal in a laboratory environment, this circuit arrangement is unsuitable for an environment in which appropriate signal generators are not to hand. The solution in accordance with WO 02/30162 is to be described below briefly with reference to the attached FIGS. 1 and 2a.

Figure 1:
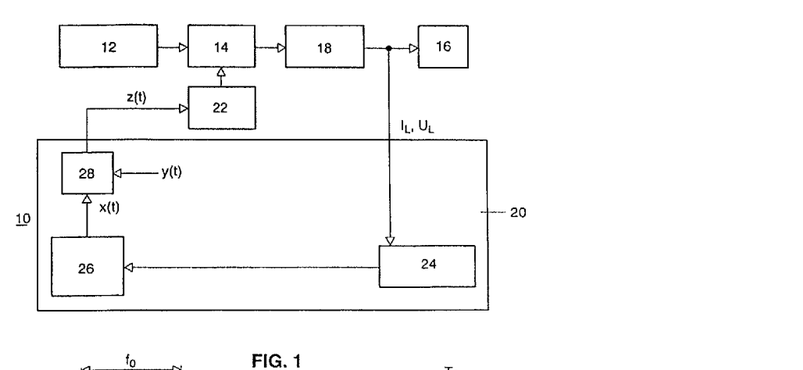
FIG. 1 shows a block diagram of an embodiment of a circuit arrangement according to the invention.
Figure 2A:
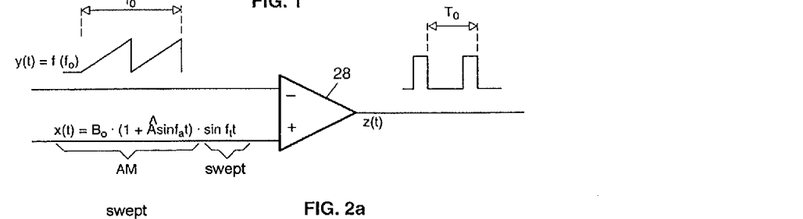
FIG. 2a shows a drive, known from the prior art, of the PWM module in accordance with FIG. 1.
Figure 5:
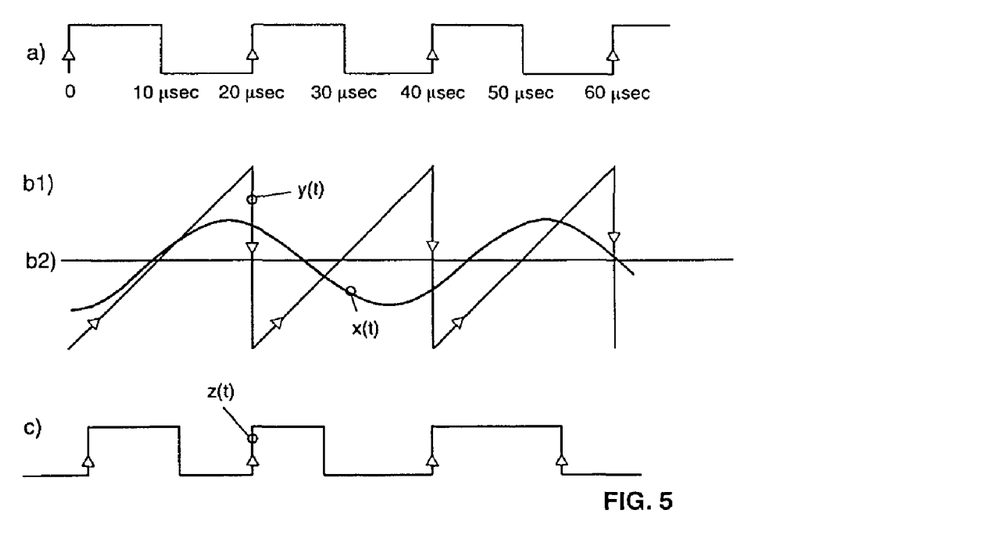
FIG. 5 shows a schematic of the generation of an asymmetric output signal of the PWM module.

The circuit arrangement 10 shown in FIG. 1 firstly comprises a preconditioner 12 that serves the purpose of power factor correction, in particular. Following thereupon is a full-bridge arrangement 14 with four switches. This serves as a commutator and changes the polarity of the voltage signal that is fed to the lamp 16 via the filter circuit 18. A drive circuit 20 that is fed the lamp current $I_L$ and the lamp voltage $U_L$ as input signal provides as output signal drive signals z(t) that are fed to driver circuits 22 for the switches of the full bridge 14. The drive circuit (20) comprises in general a power control element that operates a signal generator for controlling a PWM (Pulse Width Modulation) module. It can be implemented both in analog fashion and digitally with the aid of a microprocessor. The last named implementation variant is described below by way of example: arranged within the drive circuit 20 is a microprocessor 24, a signal generator 26 and a PWM module 28. With reference to FIG. 2a, in the prior art the PWM module 28 is on the one hand fed at the modulation input a signal $$x(t) = B_0 \cdot (1 + \hat{A} \sin f_a t) \cdot \sin f_1 t$$

that is generated in the signal generator 26 in response to the parameters provided by the microprocessor 24. In this case, the frequency $f_a$ of the amplitude modulation is in a range of between 20 and 30 kHz, while the carrier frequency $f_t$ is typically swept between 45 and 55 kHz. Consequently, the PWM module 28 must be fed a very complex signal via the signal x(t), in particular the complete signature of the desired signal. The signal y(t) fed via the system input of the PWM module 28 is a function of a constant system frequency $f_0$ (corresponding to a period of $T_0$) that is at 500 kHz in accordance with the prior art: see FIG. 5 of WO 02/30162 in this regard, for example. The following disadvantages, which are significant for practical operation, follow therefrom:

The entire full bridge and drive circuit 14, 20 must be designed for high switching frequencies. This results, on the one hand, in high costs for the required components, and secondly in high switching losses. On the other hand, high demands are placed on the signal generator 26, which must provide the complete signal signature for the PWM module 28 (comparable to the classic class D principle).

As may be gathered from WO 02/30162, page 7, lines 31 to 32, the voltage signal x(t) provided to the PWM module 28 is a low-voltage version of the waveform that is desired for driving the lamp 16. In other words, the entire information is present in the signal x(t).

To sum up, the consequence of this is that although certain advances have been made by comparison with the original approach, mentioned above, in accordance with the U.S. Ser. No. 09/335,020, these are not sufficient to permit the use as a mass produced product at an acceptable price.

SUMMARY OF THE INVENTION

It is therefore the object of the present invention to develop the circuit arrangement named at the beginning in such a way that the desired result, that is to say a mixture of the metal additives in the discharge lamp that is as far reaching as possible, can be implemented cost effectively.

The present invention is based on the finding that a particularly favorable implementation can be achieved when a comparator, for example in the form of a PWM module, is, on the one hand provided merely with an amplitude modulation signal as signal x(t), that is to say at the modulation input, while the swept carrier frequency signal is supplied as signal y(t) at the system input. The object can be achieved in a corresponding way when the phase is modulated in a suitable way instead of the pulse width. Moreover, the modulation depth at the ac voltage output toward the lamp can be set via the depth of the pulse width modulation or the depth of the phase shift. Consequently, in the case of preferred embodiments the sampling operations are of an order of magnitude of approximately 50 kHz, thus opening up implementations that save power and are cost effective.

In a particularly preferred embodiment, the analog amplitude modulation signal x(t) is generated from a digital square wave signal per filtering at an LC element. The frequency of this signal is preferably below 50 kHz, preferably between 20 and 35 kHz.

The clock frequency of the signal y(t) is preferably below 150 kHz, preferably between 40 and 60 kHz or between 80 and 120 kHz, depending on the design of the lamp to be operated thereby, in particular with regard to its sweep frequency range. The sweep frequency is preferably between 50 Hz and 500 Hz, preferably between 80 Hz and 200 Hz.

In the case of pulse width modulation, the drive circuit is preferably designed such that in each case the switches in the diagonal arms of the full bridge arrangement are driven with the aid of the same signal. In the case of phase modulation, the drive circuit comprises a phase shift module whose clock input is coupled to a source for the clock pulse swept between the first and second frequencies, and whose modulation input is coupled to a source for the signal at the third frequency ($f_a$).

The pulse width can be modulated asymmetrically or symmetrically. The drive circuit preferably comprises a PWM module whose clock input is coupled to a source for the signal swept between the first and the second frequencies, and whose modulation input is coupled to a source for the signal at the third frequency.

Furthermore, the modulation input of the PWM module is preferably coupled to a source for an offset signal, it thereby being possible to control the basic power at the full bridge output. It is thereby possible to intervene simultaneously in order to regulate the lamp power.

Further advantageous embodiments can be gathered from the subclaims.

BRIEF DESCRIPTION OF THE DRAWINGS

Embodiments of the invention will now be described in more detail below with reference to the attached drawings, in which.

DETAILED DESCRIPTION OF THE INVENTION

Figure 2B:
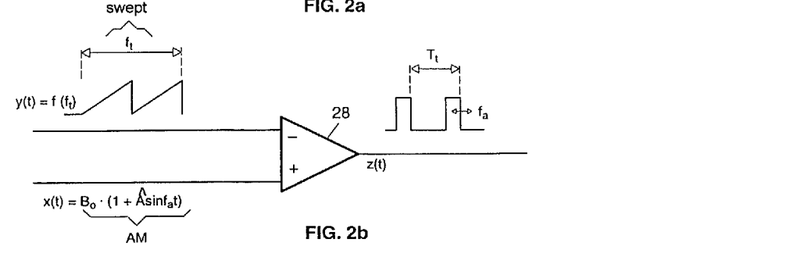
FIG. 2b shows an inventive drive of the PWM module in accordance with FIG. 1.

FIG. 2b shows the inventive driving of the PWM module 28 of FIG. 1. It may be pointed out once again that instead of a PWM module that is driven at its clock input with the aid of a square wave signal from which it generates a saw-tooth signal, as indicated in FIGS. 2a and 2b the same function can also be realized by a circuit having a comparator. In a simplified representation, specifically, a PWM module can be considered as a comparator that receives a saw tooth signal at a clock input and receives at its modulation input the modulation signal that is converted into a pulse width signal. Consequently, the signal present at the clock input, that is to say a square wave signal at the clock input of a PWM module or a saw tooth signal at the clock input of a comparator is denoted below in general by y(t). In the present case, a saw-tooth signal whose frequency is equal to the swept clock frequency $f_t$ is now applied to the clock input. Present at the modulation input of the PWM module 28 as signal x(t) is a signal that includes the amplitude modulation information, specifically the signal $$x(t) = B_0 \cdot (1 + \hat{A} \sin f_a t).$$

Provided at the output is a signal z(t) that has a period of $T_t$ and whose rear edge is displaced with the frequency $f_a$. The modulation depth can be set with the aid of the parameter $\hat{A}$.

Figure 3:
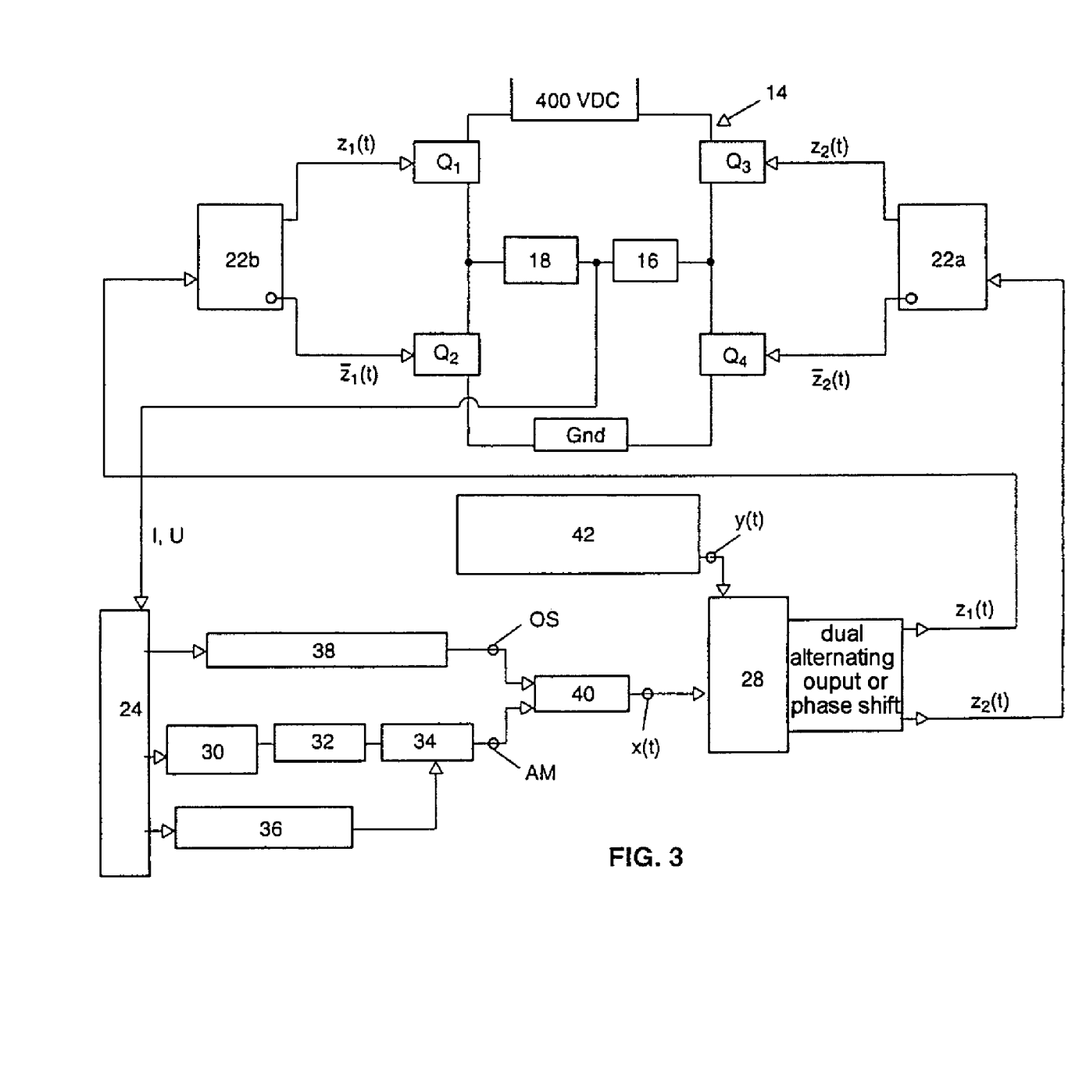
FIG. 3 shows a block diagram of a further embodiment of a circuit arrangement according to the invention.

FIG. 3 shows a further exemplary embodiment of an inventive circuit arrangement, components and modules comparable to those in FIG. 1 being denoted by identical reference symbols and not being explained again. Initiated in the microprocessor 24 is the generation of a square wave signal with the frequency that is to be used to undertake the amplitude modulation or the phase shift. A square wave signal is generated for this purpose in a square wave generator that, in order to fashion therefrom a sinusoidal signal, is routed via an LC filter 32. This sinusoidal signal is modified in a damping element 34 in accordance with a modulation index prescribed in the device 36. An offset signal OS can be defined via a unit 38, and serves for setting the lamp power. The offset signal OS and the amplitude modulation signal AM are fed to an adder 40 that generates therefrom the signal x(t) that is coupled to the modulation input of the PWM module 28. A swept clock signal y(t) is generated in the block 42 and coupled to the clock input of the PWM module 28. Depending on the embodiment, the PWM module 28 generates at its output a signal z(t) or a pair of dual alternating signals $z_1(t)$ and $z_2(t)$. If the PWM module is replaced by a phase shift module, it generates a signal pair modulated with regard to its phase angle. Yet further details will be given on this aspect with reference to FIGS. 4 to 10. The signals $z_1(t)$ and $z_2(t)$ constitute dual alternating PWM signals. They differ from one another in their phase, shifted by 180°, and serve for driving the driving circuits 22a for the switches $Q_3$ and $Q_4$, and the driver circuit 22b for the switches $Q_1$ and $Q_2$ of the full bridge 14 that is connected between a dc voltage supply (400 VDC) and ground (Gnd). In addition to the signals $z_1(t)$ and $z_2(t)$, the driver circuits 22a, 22b provide signals $\bar{z}_1(t)$ and $\bar{z}_2(t)$, $\bar{z}_1(t)$ being complementary to $z_1(t)$, and $\bar{z}_2(t)$ being complementary to $z_2(t)$.

Figure 4:
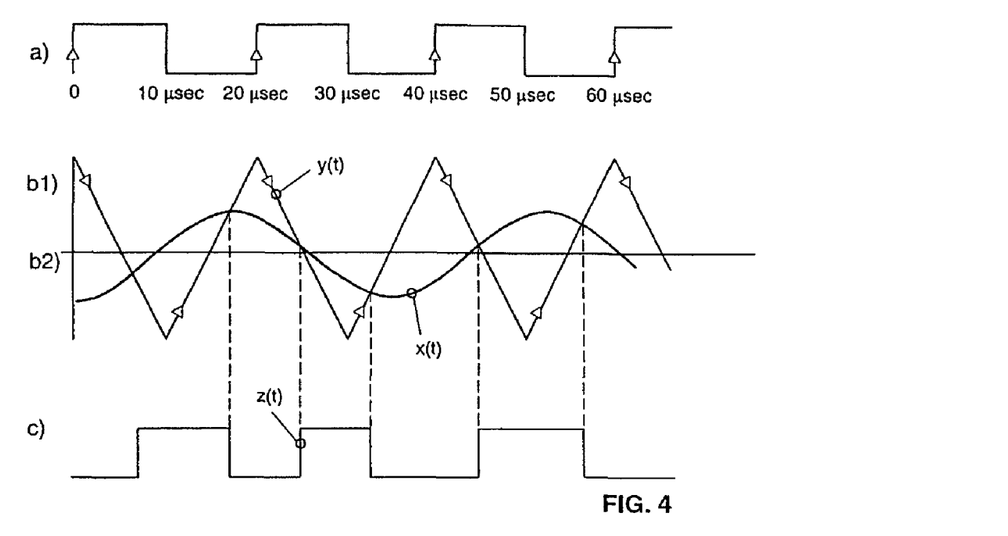
FIG. 4 shows a schematic of the generation of a symmetrical output signal of the PWM module.

FIGS. 4 and 5 show schematics of the generation of a symmetrical (FIG. 4) and an asymmetric (FIG. 5) PWM module output signal. The respective curve trace a) designates the base oscillator signal, here a square wave signal at frequency $f_t$, which is swept, for example, at a sweep frequency $f_s$ of 100 Hz between 45 and 55 kHz. The respective curve trace x(t) designates the amplitude-modulated output signal of the generator 26. x(t) is, for example, a sinusoidal signal of amplitude $\hat{A}$ current and a frequency of 24.5 kHz.

A symmetrical comparator ramp signal derived from the base oscillator signal, see curve trace a), is generated in FIG. 4 as signal y(t). An asymmetric comparator ramp signal is generated from the base oscillator signal in FIG. 5.

Applying the signals y(t) and x(t) to a comparator 28 (see FIG. 2b), for example in a PWM module, produces a respective signal z(t) that is applied to the switches of the full bridge 14 via the driver circuits 22. As is clearly evident, the gain of the signal x(t), that is to say $\hat{A}$ current in accordance with FIG. 2b, can be used to set the depth of the pulse width modulation, while the frequency of the pulse width variations is defined by the frequency $f_a$ (see FIG. 2b).

Figure 6:
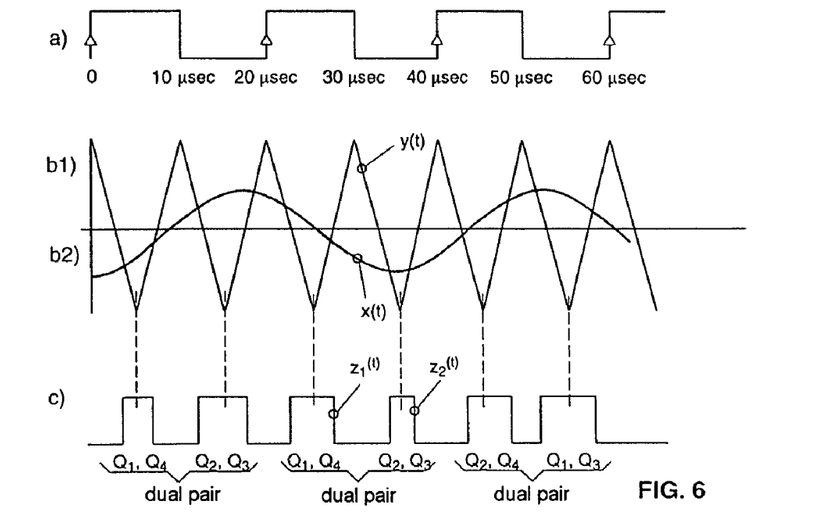
FIG. 6 shows a schematic of the generation of a dual alternating output signal of the PWM module in the case of symmetrical implementation.
Figure 7:
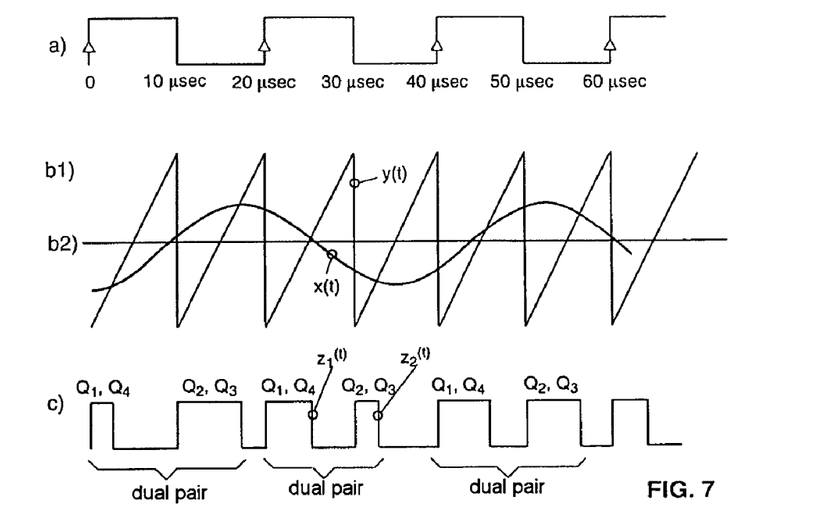
FIG. 7 shows a schematic of the generation of a dual alternating output signal of the PWM module in the case of asymmetric implementation.

FIGS. 6 and 7 show the generation of dual pairs of drive signals $z_1(t)$ and $z_2(t)$, again once with a symmetrical PWM module output signal (FIG. 6) and with an asymmetric PWM module output signal (FIG. 7). Here, means familiar to the person skilled in the art are used to derive from the same base oscillator signal that was used in FIGS. 4 and 5 a comparator ramp signal y(t) of double the base oscillator frequency. The respective amplitude modulation signal x(t) present at the modulation input is the same as in FIGS. 4 and 5. Consequently, dual pairs $z_1(t)$ and $z_2(t)$ of output signals of the PWM module 28 (not shown in FIG. 1) are produced for driving the switches $Q_1$ to $Q_4$ of the full bridge. As is obvious to the person skilled in the art, the switches respectively situated diagonally to one another, that is to say $Q_1$ and $Q_4$, and $Q_2$ and $Q_3$ are simultaneously conducting for time T.

In all four embodiments in accordance with FIGS. 4 to 7, no square wave signals with frequencies higher than $f_t$, thus not higher than 55 kHz in the present case, occur at the outputs of the PWM module 28.

Figure 8:
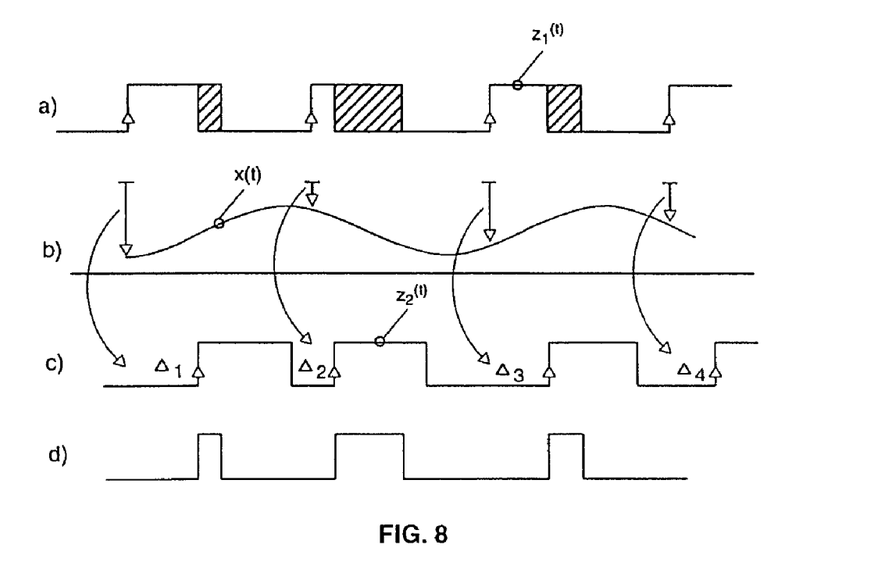
FIG. 8 shows a schematic of the generation of a phase shift in the output signal of the PWM module.
Figure 9:
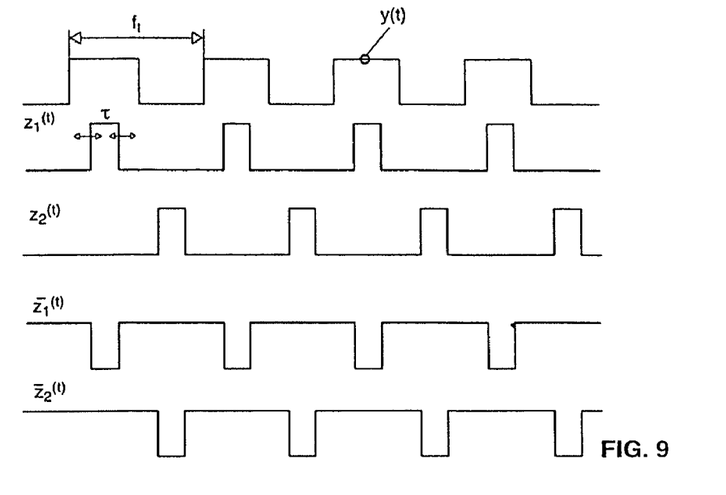
FIG. 9 shows a schematic of a comparison of dual alternating complementary signals in the case of pulse width modulation.
Figure 10:
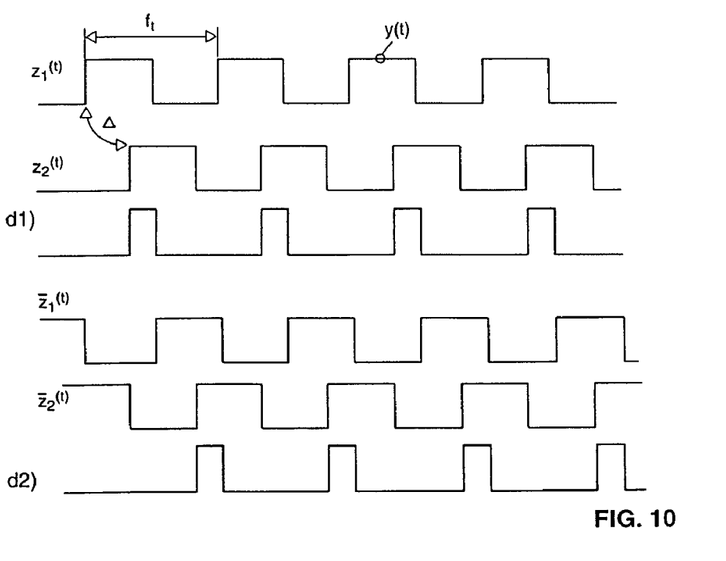
FIG. 10 shows a schematic of a comparison of dual alternating complementary signals in the case of phase modulation.

FIG. 8 shows a schematic of the generation of a PWM module output signal with phase shift, using a phase shift module (not illustrated) instead of a PWM module. Here, the base oscillator signal illustrated as curve trace a) forms the signal $z_1(t)$ and the delayed signal, illustrated as curve trace (c), whose delay value $\Delta_t$ is inversely proportional to the PWM modulation signal x(t). A PWM modulation signal of high amplitude therefore leads to a short delay, and a PWM modulation signal x(t) of small amplitude to a long delay. The vertical arrows illustrated in FIG. 8 at the curve trace b) correspond to the delays $\Delta_1$, $\Delta_2$ etc. between $z_1(t)$ and $z_2(t)$ as illustrated in FIG. 8c.

The active PWM window is illustrated in FIG. 8d as the result of driving the individual switches which contain the entire information relating to the swept clock frequency and the amplitude modulation signal. The switches of the full bridge are driven as follows with reference to FIG. 8: $Q_1$ with $z_1(t)$, $Q_2$ with $\bar{z}_1(t)$, $Q_3$ with $z_2(t)$ and $Q_4$ with $\bar{z}_2(t)$.

To illustrate, FIG. 9 shows once again, for the case of pulse width modulation, the time characteristic of the clock signal y(t) at the frequency $f_t$, as well as the signals $z_1(t)$, $\bar{z}_1(t)$, $z_2(t)$ and $\bar{z}_2(t)$. The time τ in which the respective switches are switched on is varied with the frequency fa.

To illustrate, FIG. 10 shows once again, for the case of phase modulation, the time characteristic of the clock signal y(t) at the frequency $f_1$, as well as the signals $z_1(t)$, $\bar{z}_1(t)$, $z_2(t)$ and $\bar{z}_2(t)$. The signal characteristics d1) and d2) show the effective superimposition of the signals at the switches $Q_1$ $Q_4$ and $Q_2$ $Q_3$ respectively. The delay Δ with which z1(t) follows z2(t) is varied with the frequency fa.

It may be said in general that preference is given to the methods for generating the output signals of the PWM module 28 by using a symmetrical signal y(t), since they generate fewer harmonics at the output of the full bridge 14.

The invention claimed is:

1. A circuit arrangement for operating at least one high-pressure discharge lamp comprising:
  four switches in a full-bridge arrangement, a first and a second switch forming the first half-bridge arm, and a third and a fourth switch forming the second half-bridge arm,
  at least two terminals for coupling the high-pressure discharge lamp between the midpoint of the first and the second half-bridge arms,
  at least two terminals for supplying the circuit arrangement with a dc voltage signal and
  a drive circuit for driving the four switches,
  wherein the drive circuit is designed to provide drive signals, for the four switches, whose clock pulse is swept between a first and a second frequency, and whose pulse width and/or phase is modulated with a prescribable third frequency, and
  wherein the drive circuit comprises a PWM module whose clock input is coupled to a first source for the clock pulse swept between the first and the second frequencies, and whose modulation input is coupled to a second source for the signal at the third frequency.

2. The circuit arrangement as claimed in claim 1, wherein the clock frequency is below 150 kHz.

3. The circuit arrangement as claimed in claim 1, wherein the third frequency is below 50 kHz.

4. The circuit arrangement as claimed in claim 1, wherein the sweep frequency is between 50 Hz and 500 Hz.

5. The circuit arrangement as claimed in claim 1, wherein the drive circuit is designed to drive the switches of the full-bridge arrangement with dual-alternating complementary signals.

6. The circuit arrangement as claimed in claim 1, wherein the pulse width is modulated asymmetrically.

7. The circuit arrangement as claimed in claim 1, wherein the pulse width is modulated symmetrically.

8. The circuit arrangement as claimed in claim 1, wherein the modulation input of the PWM module is furthermore coupled to a source for an offset signal.

9. The circuit arrangement as claimed in claim 1, wherein the drive circuit comprises a phase shift module whose clock input is coupled to a source for the clock pulse swept between the first and the second frequencies, and whose modulation input is coupled to a source for the signal at the third frequency.

10. The circuit arrangement as claimed in claim 2, wherein the clock frequency is between 40 and 60 kHz.

11. The circuit arrangement as claimed in claim 2, wherein the clock frequency is between 80 and 120 kHz.

12. The circuit arrangement as claimed in claim 3, wherein the third frequency is between 20 and 35 kHz.

13. The circuit arrangement as claimed in claim 4, wherein the sweep frequency is between 80 Hz and 200 Hz.

* * * * *